United States Patent
Finley et al.

(10) Patent No.: US 7,257,536 B1
(45) Date of Patent: Aug. 14, 2007

(54) AUDIO REQUEST INTERACTION SYSTEM

(75) Inventors: Michael C. Finley, Duluth, GA (US);
Michael Dudgeon, Kennesaw, GA (US); Lehman Zellosis Smith, IV, Alpharetta, GA (US); John Wade, Alpharetta, GA (US); David Griffin, Atlanta, GA (US); David Edward McCaw, Jr., Atlanta, GA (US); James Lee Fortuna, Marietta, GA (US)

(73) Assignee: Radiant Systems, Inc., Alpharetta, GA (US)

( * ) Notice: Subject to any disclaimer, the term of this patent is extended or adjusted under 35 U.S.C. 154(b) by 890 days.

(21) Appl. No.: 09/712,788

(22) Filed: Nov. 14, 2000

Related U.S. Application Data

(60) Provisional application No. 60/166,965, filed on Nov. 23, 1999.

(51) Int. Cl.
*G10L 15/00* (2006.01)
*G06F 17/60* (2006.01)
*G06Q 30/00* (2006.01)
*H04M 11/00* (2006.01)

(52) U.S. Cl. .................... 704/270; 705/26; 379/101.01

(58) Field of Classification Search ................ 704/331, 704/270, 270.1; 705/26, 27; 379/101.01; 348/473; 455/154.1, 158.2
See application file for complete search history.

(56) References Cited

U.S. PATENT DOCUMENTS

| 5,539,635 A | * | 7/1996 | Larson, Jr. ................... 704/270 |
| 5,949,492 A | | 9/1999 | Mankovitz ............... 455/154.1 |
| 5,991,737 A | | 11/1999 | Chen ........................... 705/26 |

OTHER PUBLICATIONS

Article titled "*A Star is born nationally. seeking stellar CD sales (StarCD is expanding its service nationwide that identifies music being played on the radio)*"; published in Hollywood Reporter; Nov. 1, 1999; v ccclx, n 13, p. 3+.

* cited by examiner

*Primary Examiner*—David D. Knepper
(74) *Attorney, Agent, or Firm*—Needle & Rosenberg, P.C.

(57) ABSTRACT

A person can use a portable electronic device to electronically purchase or otherwise request a product, service or other deliverable related to audio programming to which the person is listening at the time they initiate the request. The request is fulfilled by a service that analyzes the audio content to identify the deliverable the person desires.

6 Claims, 7 Drawing Sheets

AUDIO REQUEST INTERACTION SYSTEM

CROSS REFERENCE TO RELATED APPLICATION

This application claims priority to U.S. Provisional Application Ser. No. 60/166,965 filed Nov. 23, 1999 which is incorporated by reference in its entirety.

BACKGROUND OF THE INVENTION

1. Field of the Invention

The present invention relates to electronically initiated consumer sales transactions and, more specifically, to selling products or services related to audio programming to which the purchasers are listening at the time they initiate the purchases.

2. Description of the Related Art

Today's consumers are increasingly mobile. Consumers on the go may prefer to attend to matters as they think of them rather than defer action until a later time. In today's mobile world, it is while listening to the radio, passing a television screen, or driving down the road that people think of items they need and things they have to do. For example, a person may be driving to work and hear a radio advertisement for an upcoming concert he or she would like to attend. At the time, it sounds like a great idea, and the person is motivated to buy tickets. Nevertheless, to act on this desire to buy tickets, the person generally must record the relevant information such as a telephone number that he or she hears advertised, and use a separate device such as a telephone to submit an order. While driving a car it can be difficult to grab paper and pen and record the required information at the time of broadcast. Another difficulty is that, although the information may be available, the person may forget it between the time he or she hears the broadcast and the time he or she is able to reach a telephone and inquire about making a purchase. Frequently, the delay causes the consumer to lose interest in making the purchase, as most purchase decisions are made impulsively.

Encouraging consumers to act on purchase decisions made in response to contemporaneously delivered advertising or other programming or content has been suggested in the art. For example, *CD™ is an automated service tailored to purchasing music heard on a radio broadcast. Like most payment processes, *CD™ requires the consumer to enter a PIN after receiving a purchase summary. This second step is a typical limitation of existing ordering services. Using a phone or internet access site, the listener can key in a radio station and the service will identify the song currently playing. While the service allows the consumer to sample or purchase the CD, it only applies to musical selections on the radio.

Another music purchasing device, known as eGo™, also requires additional steps on the part of the consumer. This device is limited to downloading material from the World Wide Web ("the web") for playback or purchase. In order to record or purchase content, eGo must be connected to a computer. This requirement of a second device restricts the consumer's mobility, as eGo™ offers only play back capability when disconnected. While eGo™ allows the purchase of advertised goods other than music, the only purchase options are those available from the web.

Another such device, known as Sonicbox™, like eGo™, allows purchase of items only from the web, and not from other media forms. Sonicbox™ requires an add-on component for the user's computer as well as the input signaling device. While Sonicbox™ does allow the consumer to submit a purchase while away from the computer, it has a very limited range of 100 feet. Still other devices, such as eMarker™ and iTag™, require the user to connect the devices to a computer before they can be used to order selected products. Furthermore, they are limited to broadcast radio content.

Other systems that interact with listeners of audio broadcasts have been suggested. U.S. Pat. No. 5,703,795 discloses apparatus and methods for accessing information about audio broadcasts. Similarly, the device disclosed in U.S. Pat. No. 5,561,849 supplies lyrics to audio as it is received and played. Systems disclosed in U.S. Pat. No. 5,557,541, U.S. Pat. No. 5,539,635, U.S. Pat. No. 5,857,149, and U.S. Pat. No. 5,918,213 all allow, in different ways and to different degrees, a listener to select broadcast content. The scanner and mark system disclosed in U.S. Pat. No. 5,640,193 also provides means for the consumer to obtain product information. With the device disclosed in U.S. Pat. No. 5,590,195, a listener is limited to selecting and storing audio content at the time of broadcast.

Some products are known that attempt to improve a limited aspect of the purchase experience. For example, the Home Shopping Video Catalog disclosed in U.S. Pat. No. 5,451,998 presents merchandise in video format with respective ordering information for the customer to purchase items over the phone or internet. This catalog does not address the problem of spontaneous ordering, nor does it allow the consumer to make other types of requests. An automated ordering method presented in U.S. Pat. No. 5,808,894 allows customers to compose ordering information offline, but they must still connect to a phone or computer to submit a purchase. With the Network Sales System described in U.S. Pat. No. 5,715,314 (and its CIP U.S. Pat. No. 5,909,492), customers can both research and purchase products, but this device does not address the need for mobility or alternative types of requests.

U.S. Pat. No. 5,857,156 describes a portable device into which the user can enter an identification code for a product to initiate its purchase, but the consumer must locate and manually enter a code each time. The device disclosed in U.S. Pat. No. 5,007,084 provides composite billing and direct payment service, but it does not allow the consumer to order products or otherwise interact with any media. A portable point-of-sale device is disclosed in U.S. Pat. No. 5,408,077, but purchases are limited, and it does not address the need for other types of interaction. Both of these devices address only the purchase aspect of the user experience.

It would be desirable to provide a system and method that enables consumers to initiate purchase requests in response to audio broadcasts relating to a product or service. The present invention addresses these problems and deficiencies and others in the manner described below.

SUMMARY OF THE INVENTION

The present invention relates to a method and system for facilitating a transaction with a person listening to remotely transmitted audio content. The term "content" as used herein refers to the substance of the audio to which the person is listening, such as a song or an advertisement. The transmission medium may be commercial broadcast radio, a computer network or any other suitable medium capable of transmitting a signal representing audio content. When the person hears something that he or she would like to request, the person uses an electronic request device to initiate a request. The device transmits the request to a remote service via a suitable medium such as a radio communication link or computer network. The remote service identifies a deliverable that relates to the request and controls its delivery to the person who initiated the request.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

The following is a description of an exemplary embodiment of the invention in which a person who is listening to audio, such as a radio broadcast, is able to electronically initiate requests that relate to the content to which he is listening. Although in the exemplary embodiment the medium by which the audio is received is commercial broadcast radio, in other embodiments it can be a computer network, a private radio network, broadcast or cable television, telephone, or any other suitable medium capable of transmitting a signal representing audio content. As noted above, the term "content" as used herein refers to the substance of the transmitted audio, such as a song or an advertisement or other offer.

Figure 1:
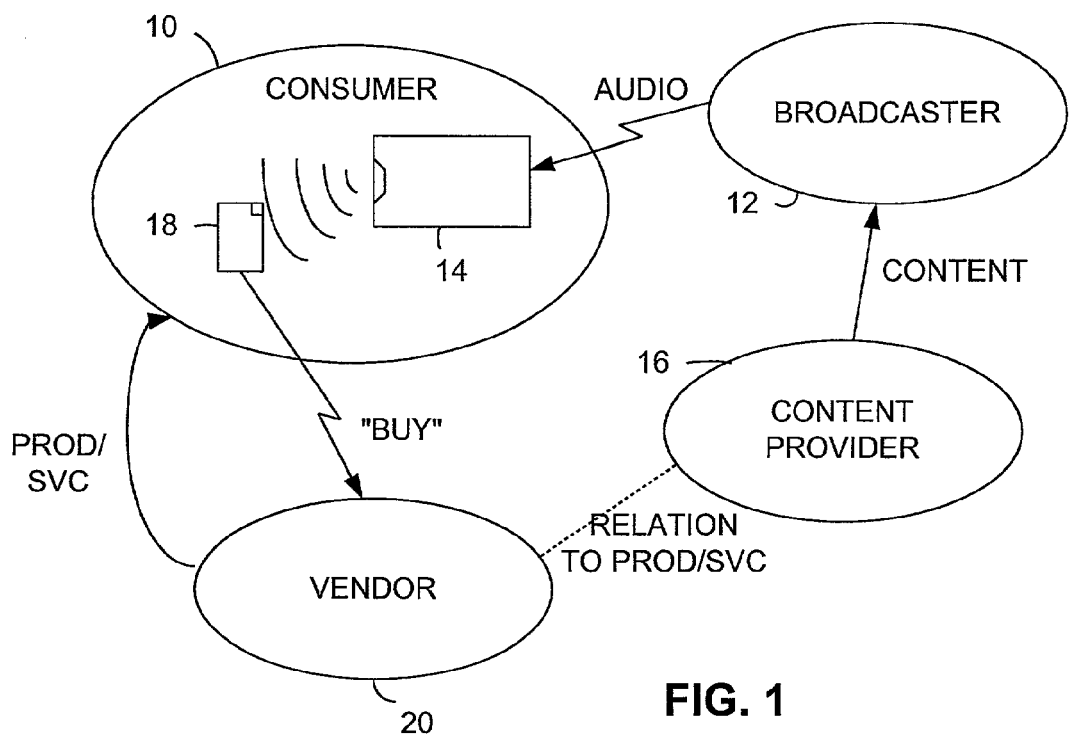
FIG. 1 illustrates a system in which a consumer initiates a purchase of a product or service related to audio programming to which the consumer is listening at the time he or she initiates the purchase.

As illustrated in FIG. 1, a consumer 10 listens to radio programming broadcast from a remote broadcaster 12 to a conventional radio receiver 14 in the conventional manner. A content provider 16 provides content to broadcaster 12. For example, the content can be songs that are provided in the form of audio recordings. Content can also include advertisements and other offers. Consumer 10 uses a device 18 to initiate requests that relate to the content. For example, if consumer 10 is listening to a song, he or she can request a copy of the recording. If consumer 10 is listening to an advertisement for a product or service, he or she can request the product or something representing the service (e.g., theater tickets). In the case of the illustrated embodiment of the invention, content provider 16 can be a record company, advertiser, or other entity that has an interest in providing content for broadcast radio. A vendor 20 that has some relation to the product or service fulfills the order. Vendor 20 can be, for example, an entity that operates what is referred to herein as a processor host service (PHS). As described below in further detail, the PHS responds to the request received from device 18 by identifying a product, service or other deliverable relating to the request and delivering it to consumer 10. The PHS can also receive payment from consumer 10 and perform any other steps required to complete the transaction, such as arranging for delivery. Delivery can be electronic or by mail or other conventional means. For example, in an instance in which consumer 10 is listening to a song, the PHS can determine the recording to which the song relates and consummate a sale of the recording to consumer 10.

Figure 2:
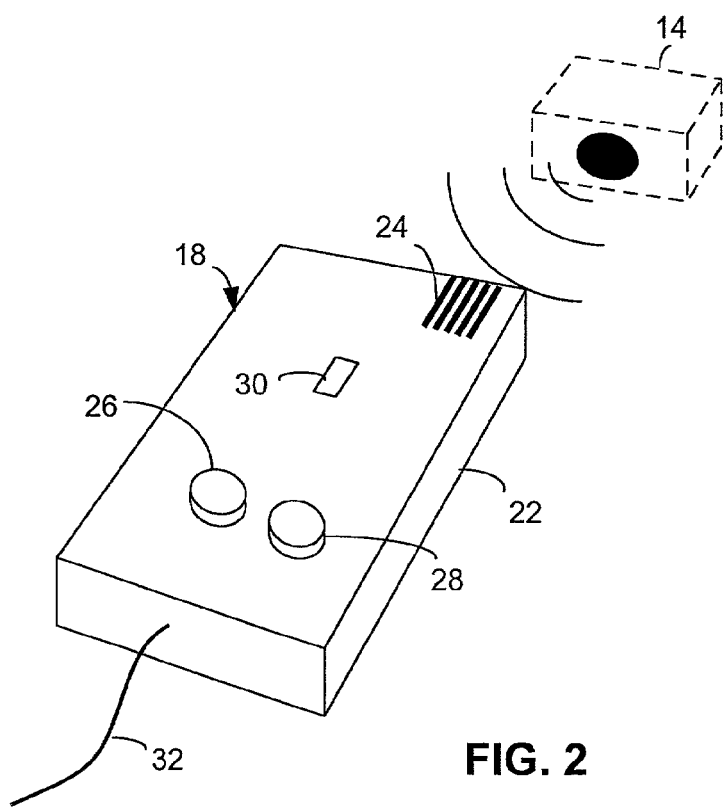
FIG. 2 is a perspective view of an audio request device.

Device 18 can be a portable device resembling a pager, cellular telephone, personal digital assistant or similar portable electronic device in size. It can be hand-held or mounted on a dashboard or other area of a vehicle (not shown) within reach of the driver. Consumer 10 can thus initiate requests while driving and listening to the radio. As illustrated in FIG. 2, device 18 includes a housing 22, a microphone 24 that picks up the audio from the vehicle's radio, a request button 26, a record button 28, an indicator lamp 30, and a power cord assembly 32. Request button 26 may be referred to as a BUY button because consumer 10 can press it when he or she would like to purchase a product or service to which the audio programming relates. Alternatively to having a microphone 24, in other embodiments of the invention the audio can be received via a wired connection directly to the vehicle's radio tuner or a separate radio tuner (not shown). In such other embodiments the device can, for example, be integrated with a radio or other electronic device, such as a cellular telephone or computer. Power cord assembly 32 is a multi-functional assembly described in further detail below, and has a plug (not shown) that fits into a vehicle's cigarette lighter (or alternative 12 volt power connection). Alternatively to receiving power from the vehicle, or to maintain continuous functionality in case of power interruption, a long-life battery (not shown) can included within housing 18.

With the car powered and the radio on, device 18 is activated and capable of interacting with the broadcast medium. BUY button 26 and RECORD button 28 are positioned on housing 22 in any suitable manner that promotes ease of use or is otherwise ergonomically reasonable. Indeed, housing 22 can have an ergonomic shape that conforms to a person's hand grip and otherwise promotes easy actuation of buttons 26 and 28. RECORD button 28 can, for example, be positioned in a manner that facilitates actuation by a person's palm, such that both it and button 26 can be actuated using only a single hand. RECORD button 28 is referred to by that name because, as described in further detail below, pressing it causes device 18 to store the most recent recording of the broadcast audio. Indicator lamp 30 can be a tricolor light-emitting diode (LED) that illuminates in either a red, green, or yellow color to reflect the status of the link (inoperative, connected, or attempting to connect, respectively) between the device and the broadcast signal.

Figure 3:
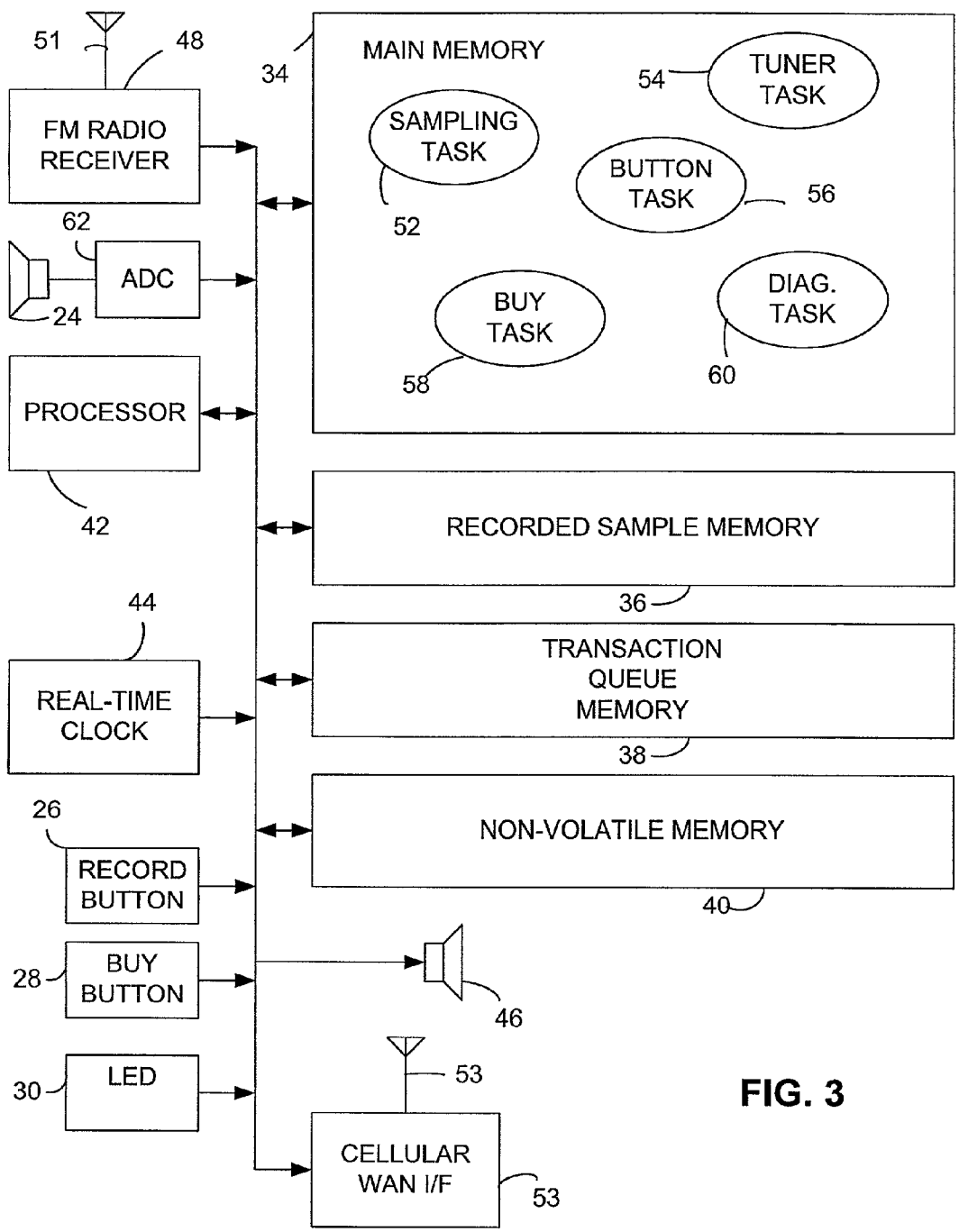
FIG. 3 is a block diagram of the device.

As illustrated in FIG. 3, device 18 further includes a working memory or main memory 34, a recorded sample memory 36, a transaction queue memory 38, non-volatile memory 40, a processor 42, a real-time clock 44, a speaker 46, a frequency-modulation (FM) radio receiver 48, and a cellular wide-area network (WAN) interface 50. A wire antenna 51 associated with radio receiver 48 and a wire antenna 53 associated with WAN interface 50 can both be concealed within a molded sheath covering power cord assembly 32 (FIG. 2). Processor 42, which can be a microprocessor, microcontroller or similar device, operates in the conventional manner in accordance with a stored program in the form of software or firmware. Although the program can have any suitable structure, for purposes of illustration it can include a sampling task 52, a tuner task 54, a button task 56, a buy task 58 and a diagnostic task 60. Although illustrated for purposes of clarity as residing in memory 34, persons skilled in the art to which the invention pertains will understand that all such tasks may not actually be stored in memory 34 simultaneously or in their entireties. Rather, processor 42 may retrieve portions of such software or firmware from other memory devices for execution on an as-needed basis. The memory arrangement shown in FIG. 3 is provided for purposes of illustration only and can include any suitable combination of random-access memory, read-only memory, programmable logic, hard-wired logic, and similar devices. Because such programming concerns are matters of design choice well-understood to persons skilled in the art, they are not described in further detail herein. In view of the description of the operation of device 18, such persons will readily be capable of suitably programming processor 42 to perform the described tasks and otherwise operate in accordance with the invention.

When device 18 receives power, processor 42 begins operating in accordance with its programming. Microphone 24 receives audio from the car radio 14 (FIG. 1). An analog-to-digital converter 62 converts the audio signal to digital form. In accordance with sampling task 52, processor 42 controls recording of the digitized signal in memory 34 on a continuous first-in-first-out (FIFO) basis. In other words, an area of memory 34 stores the digitized signal in a manner that represents a predetermined number of seconds of audio, and each memory location is overwritten at intervals of that number of seconds. The interval of stored audio is sufficient to enable it to be identified, either by automated means or by a human analyst employed by the PHS, as described in further detail below. In the illustrated embodiment, in which the content is commercial radio programming such as music and advertisements, an interval of five to ten seconds may be sufficient to identify the content.

While the audio is being sampled as described above, in accordance with tuner task 44 processor 42 causes FM radio receiver 48 to scan or sequentially tune common broadcast frequencies and digitize the received audio stream and compare it to the audio received via microphone 24. When processor 42 detects that the audio signal received via receiver 48 matches that received via microphone 24, it ceases scanning and maintains the frequency, thereby locking the broadcasting station in.

Figure 4:
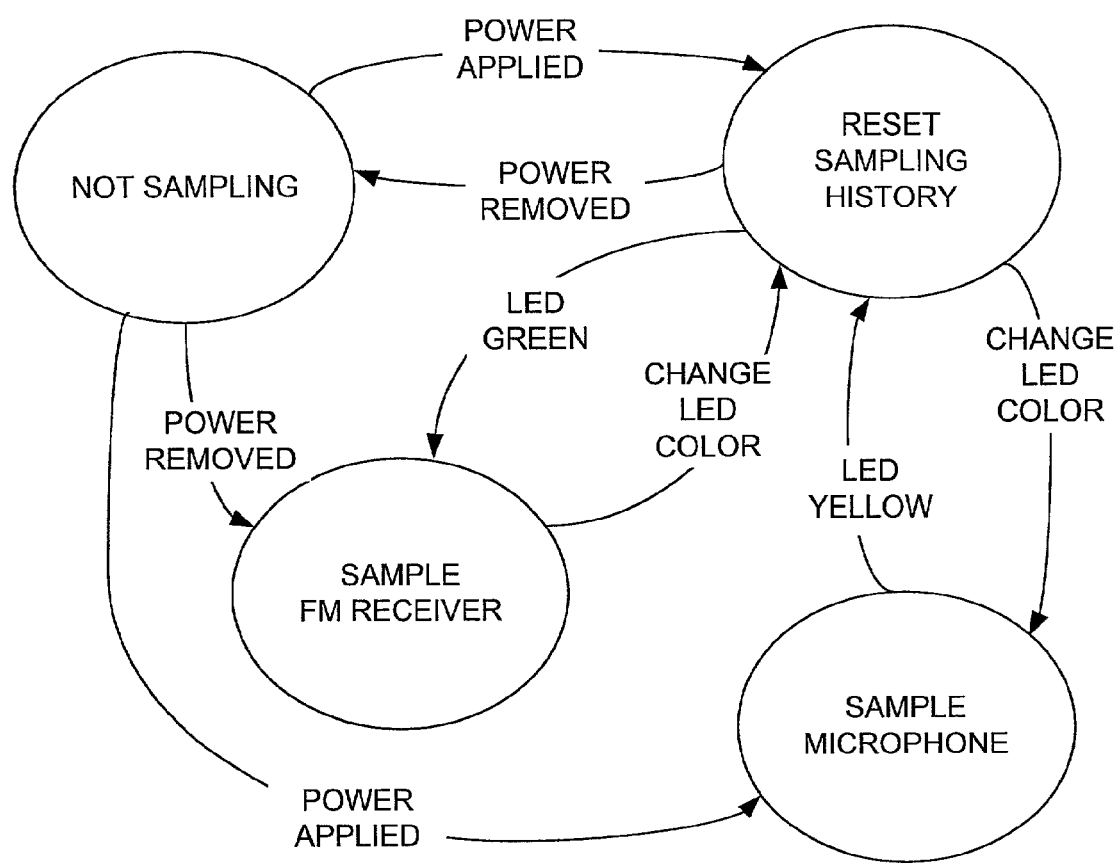
FIG. 4 is a state diagram relating to the sampling task.

Processor 42 also controls LED indicator 30 to indicate the state of the above-described process. As illustrated in FIG. 4, when audio sampling is occurring processor 42 causes LED indicator 30 to be yellow. When a frequency match is detected, processor 42 causes LED indicator 30 to change to green. If there is a change in the state of the frequency match between the audio received via microphone 24 and receiver 48 (i.e., the station lock is lost), processor 42 causes the existing digital recording to be erased from memory 34 and causes recording to begin again.

Figure 6:
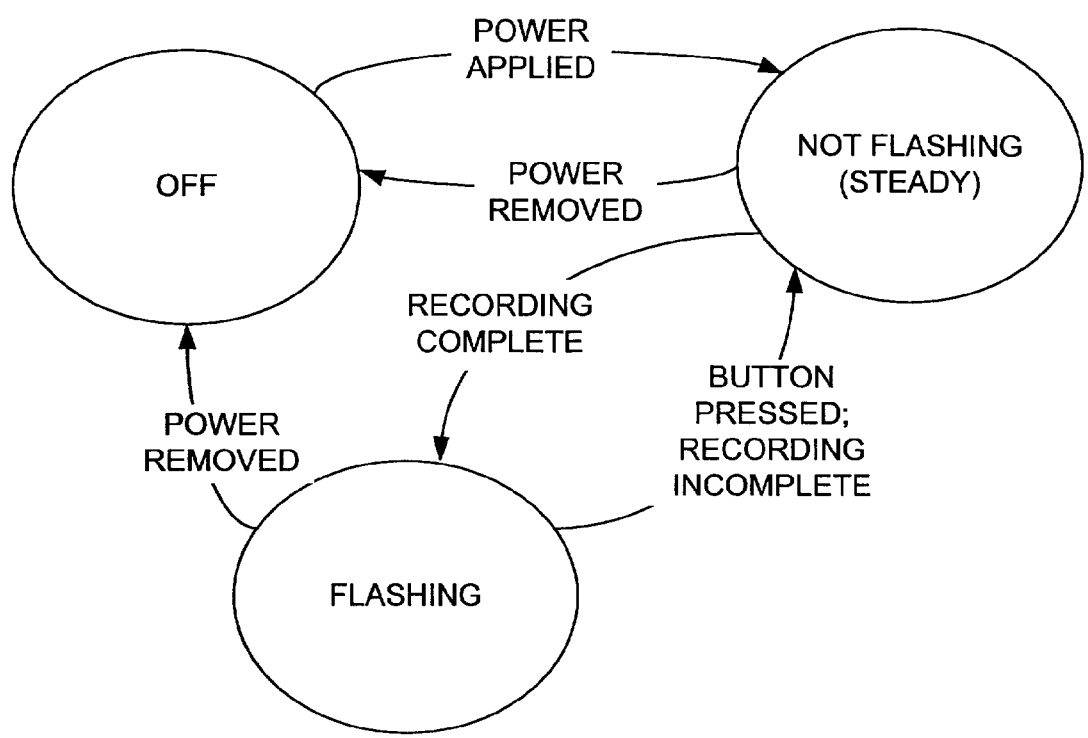
FIG. 6 is a state diagram relating to the state (flashing or steady) of the status indicator lamp.

When consumer 10 wishes to initiate a request for a product or service relating to the content to which he or she is listening, consumer 10 presses BUY button 26. In response, in accordance with button task 56 processor 42 causes a request to be transmitted via WAN interface 50 and adjusts the state of LED indicator 30 accordingly. As illustrated in FIG. 6, when consumer 10 presses the BUY button 26 and LED indicator 30 is yellow or green, processor 42 determines, in accordance with sampling task 52, whether a sufficient audio interval has been recorded. If a minimum time (estimated 30 seconds) has not passed since recording was last reset, processor 42 causes LED indicator 30 to flash. While LED indicator 30 is flashing, processor 42 continues to cause the broadcast audio to be recorded to create the requisite minimal recording interval. If tuner task 54 indicates that the broadcast frequency lock is lost during this recording period, it causes speaker 46 to emit an error tone. Processor 42, in accordance with button task 56, then resets the system, enabling BUY button 26 to be pressed to re-initialize the request sequence.

When a sufficient audio interval (record) has been recorded, in accordance with button task 56 microprocessor 42 causes LED indicator 30 to return to a steady, i.e., non-flashing, state and causes the recorded digitized audio to be copied into transaction queue memory 38. Once the copying is complete, processor 42 causes speaker 46 to emit a high-pitched tone to indicate successful recording and resets the system, enabling BUY button 26 to be pressed again to initiate a new request sequence.

In accordance with buy task 58, when a record is recorded in transaction queue memory 38, processor 42 attempts to initiate a serial-line internet-protocol (SLIP) connection between WAN interface 50 and the PHS. The creation of a SLIP connection and the manner in which wireless Internet devices operate are well-known in the art and therefore not described herein. If a telephone number needs to be dialed, the number can be retrieved from non-volatile memory 40, in which it could have been stored either during the initial configuration of device 18 or during a service call. After connecting to the PHS, in accordance with buy task 58 microprocessor 42 creates a communication record (temporarily in memory 34) that includes:

1. the purchase sequence number (also stored in non-volatile memory 40 and incremented with each interaction);
2. the time the record is created, or zero filled time field if the time is indeterminate;
3. the broadcast frequency, or zero filled frequency field if the frequency is indeterminate;
4. the serial number of device 18; and
5. the digitized audio sample itself.

Processor 42 also initiates a security check of the type commonly performed in wireless data network transactions. Once the security check is satisfied, processor 42 encrypts the transaction record and causes it to be transmitted or uploaded to the PHS via WAN interface 50. When receipt of the transaction record is acknowledged by the PHS, in accordance with buy task 58 processor 42 searches for additional records in memory 34 that may be pending transmission and, if found, causes each to be transmitted in turn in the manner described above. After all pending records have been sent, processor 42 ends the SLIP connection with the PHS, resets transaction queue memory 38, and returns to a state in which it awaits creation of another transaction record.

If the wireless WAN connection fails for any reason (e.g., no cellular service, no answer, error answer, security failure, or abnormal disconnect), in accordance with buy task 58 processor 42 initiates a network disconnect and begins periodically attempting to create a new connection and upload. After a predetermined time (on the order of days) with no success uploading a transaction record, the record is discarded and the process terminates.

Consumer 10 can submit a delayed or time-shifted request. In other words, consumer 10 may hear a song and want to order it, but choose to submit the request at a later time. For example, perhaps consumer 10 has driven out of the local WAN range and wishes to avoid additional service charges for contact at this time. To prevent the audio recording from being overwritten in the continuous FIFO process, consumer 10 can press RECORD button 28. When RECORD button 28 is pressed, the device moves the most recent audio sample to a different, reserved area of memory where it will not be overwritten. This audio request will be submitted when consumer 10 next presses BUY button 26.

Figure 5:
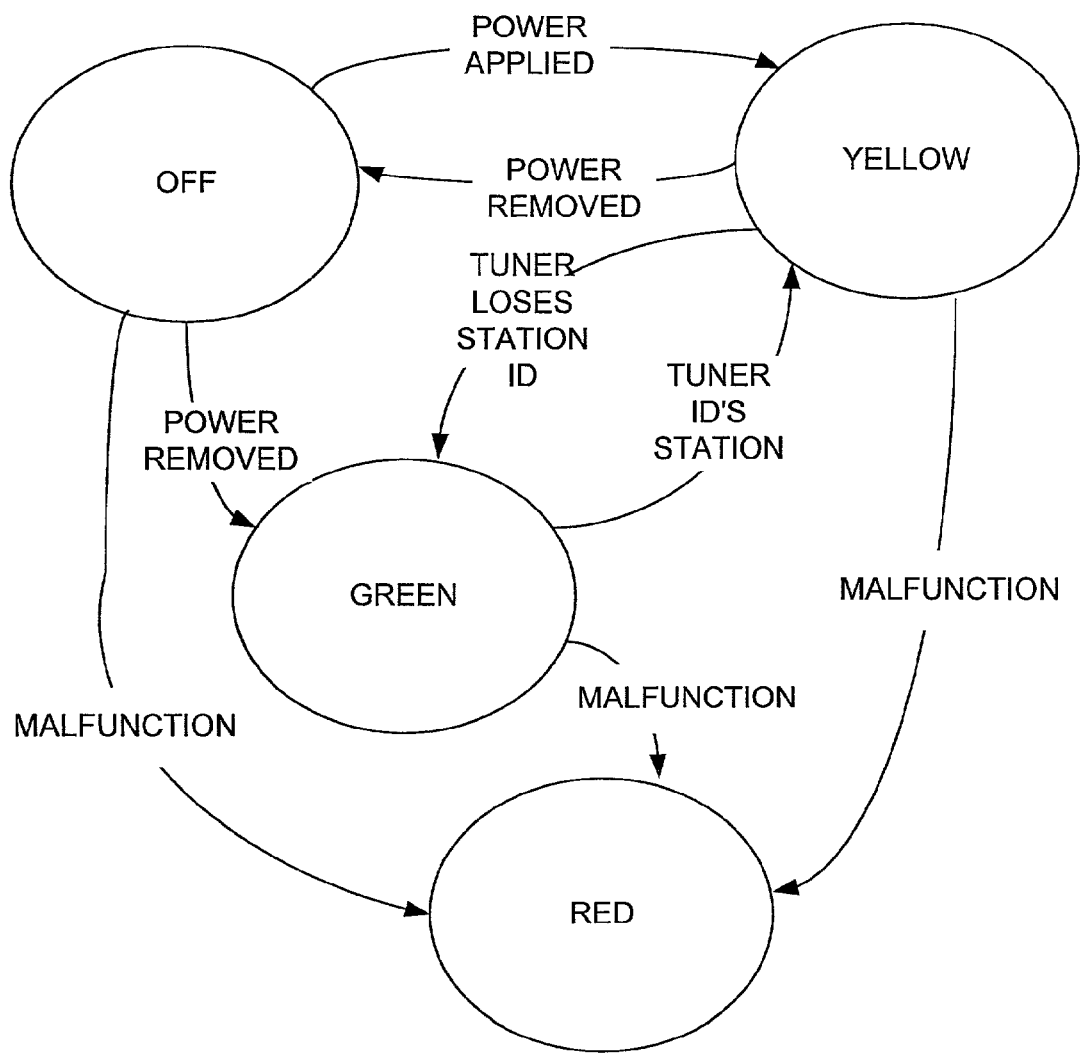
FIG. 5 is a state diagram relating to the color of the status indicator lamp.

FIGS. 5 and 6 illustrate how LED indicator 30 changes color and state (flashing or steady) to indicate status. Initially, LED indicator 30 is yellow to indicate that device 18 has not yet matched the audio being heard in the car to the frequency of the station broadcasting that audio. To isolate the broadcasting station's frequency, processor 42 in accordance with tuner task 54 continuously samples the audio frequency by analyzing input from microphone 24. At the same time, it continuously alters the frequency of FM receiver 48 until the frequency of the station setting matches the frequency of the input from receiver 48. When processor 42 matches the frequency of receiver 48 to that of the signal carrying the audio received by microphone 24, it triggers a change in LED indicator 30 from yellow to green.

If there is an interruption in the signal or other cause of a loss of match between the audio input to microphone 24 and the signal input to receiver 48, processor 42 in accordance with tuner task 54 causes LED indicator 30 to change to yellow. A yellow indication reflects the fact that device 18 does not have a lock on the broadcasting station and therefore warns consumer 10 that pressing BUY button 26 will not initiate a request.

In accordance with diagnostic task 60 processor 42 monitors the inputs to device 18 to determine if it is functioning properly. When an error is identified, processor 42 causes LED indicator 30 to become red. While LED indicator 30 is red, pressing BUY button 30 will not cause a request to be transmitted; rather, there will be no response.

In addition to the above, in other embodiments of the invention the consumer-operated device can be equipped with a variety of combinations of other buttons for various other types of interactive purposes. For example, an INFO button (not shown) can be included, whereby the user can request information about the product or service being broadcast at the time. Other buttons, such as a REGISTER button, can be included for additional interactive functionality. Such a REGISTER button can, for example, be used to initiate a procedure by which a user signs up for an event or subscribes to a service. Depending upon the broadcast medium and use of the device in such embodiments, the user may prefer different combinations and uses of the interface.

Figure 7:
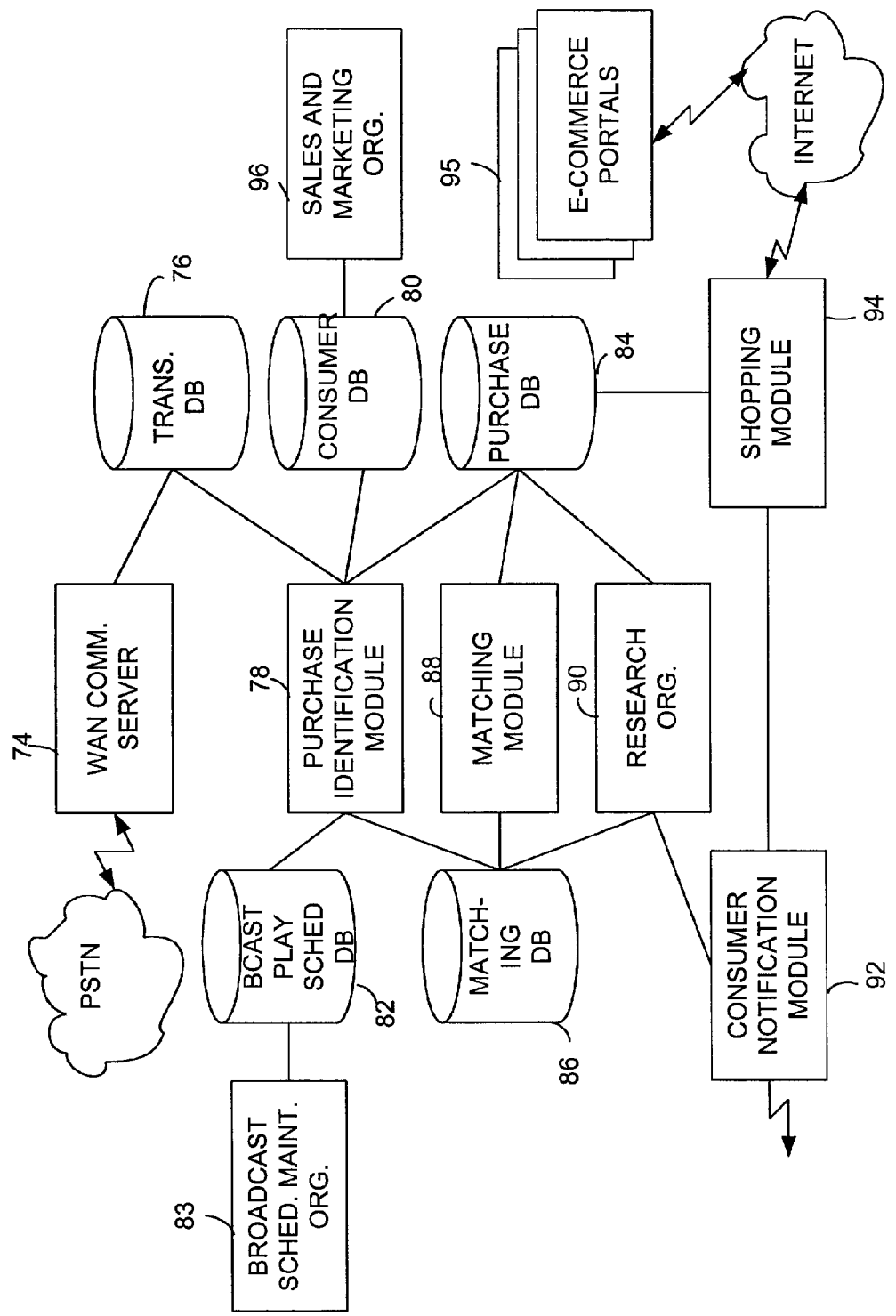
FIG. 7 is a block diagram of the remote service that fulfills the request.

The PHS is illustrated in FIG. 7. Consumer 10 uses device 18 in concert with a subscription to the PHS and consumer 10 may purchase both together as a package. (The term "host processor service" or "PHS" is used herein to refer to both the service itself that consumer 10 receives as well as the business entity and its equipment that provide the service.) Before use, the PHS stores a consumer profile and configures device 18. At this time, the PHS and consumer 10 determine specifics of the functionality of device 18. For example, instead of having the PHS configure real-time clock 44, consumer 10 can choose to have device 18 programmed to sample readings from the Global Positioning System (GPS) or receive signals from the National Time Standard broadcast. In alternative embodiments, consumer 10 may have purchased a unit equipped with additional buttons (not shown) for manually setting the time, date, and WAN calling numbers. This option may be preferable to a user who often travels through time zones or calling regions and may wish to adjust the settings frequently.

Although a cellular WAN is used in the illustrated embodiment of the invention, in other embodiments a variety of other media can be used to submit requests, such as cellular, GSM, PCS, or other mobile media. Depending upon the particular communication alternative, the process by which a request is submitted, received, and processed may vary. If the device is designed to utilize mobile cell phone technology, for example, bluetooth technology can be used to communicate with a nearby cell phone that would relay the data to the Internet. For these requests, the PHS may support a request Web page that can be linked to its product database. In such embodiments, requests can be directed to this page and may automatically initiate a search for the matching product in the database. Or, the signal can be sent using telephone or pager data bands including two-way paging systems. Technicians at the PHS can respond directly to pages.

In other embodiments of the invention, data identification and processing can be done with many variations of the system and method. Programming of the possible broadcast stations can be obtained through their Web sites, published programming schedules, linked databases between the service and broadcast stations, or a variety of manual communications such as telephone or e-mail. In still other embodiments, a real-time link between Internet broadcasts from stations local to the user's area and the PHS's digital database of broadcasting can be established. In a particular embodiment, the process of identification can depend upon the nature of the request sample submitted. If the data are sent as a digital hash recorded at the time of purchase, for example, the PHS can perform a statistical or mathematical analysis on the data to match it with information in the broadcast programming database. This analysis can be performed using speech recognition technologies, speaker identification systems, or other technologies that perform data analysis. As an alternative to comparing the sample with those in the database, technicians employed with the PHS can manually review the sample and determine a match with the appropriate broadcast program segment.

One of the central features of the device is its ability to communicate quickly and effectively with the server at the PHS. This aspect makes the invention easy to update as technology improves. For example, as capabilities are enhanced on the central processor, the device, or the interface between them, the PHS can serve the alternate function of updating the software system on the device. This function can be accomplished by a secure, executable program download from the PHS.

In an alternative embodiment (not shown), instead of processor 42 there is a set of discrete or field-programmable logic that incorporates each of the above-described peripherals and controls their interaction based on the simple states described above. In this case, cryptography and network protocols are assumed to be integral with the cellular modem subsystem of the device. The function of processor 42 will also vary with alternative embodiments in which the request identification process differs. For example, in the case where the device produces a digital hash sample rather than a recording of microphone input, processor 42 would not produce recordings in the same way. Alternative means of sampling would be particularly desirable in embodiments where the data comprise audio segments (large sizes), slower communication technology (slower modems or phone lines) or expensive communication lines (long distance or out-of-network wireless systems).

In still other embodiments, a user can specify requests through manual entry of a broadcast station frequency. In such embodiments the device can, for example, include a CHANNEL button for selecting a frequency. When interested in a particular broadcast station's program, the user enters the channel information and presses a BUY button. The PHS uses the channel information, time, and date to identify the request.

Figure 8:
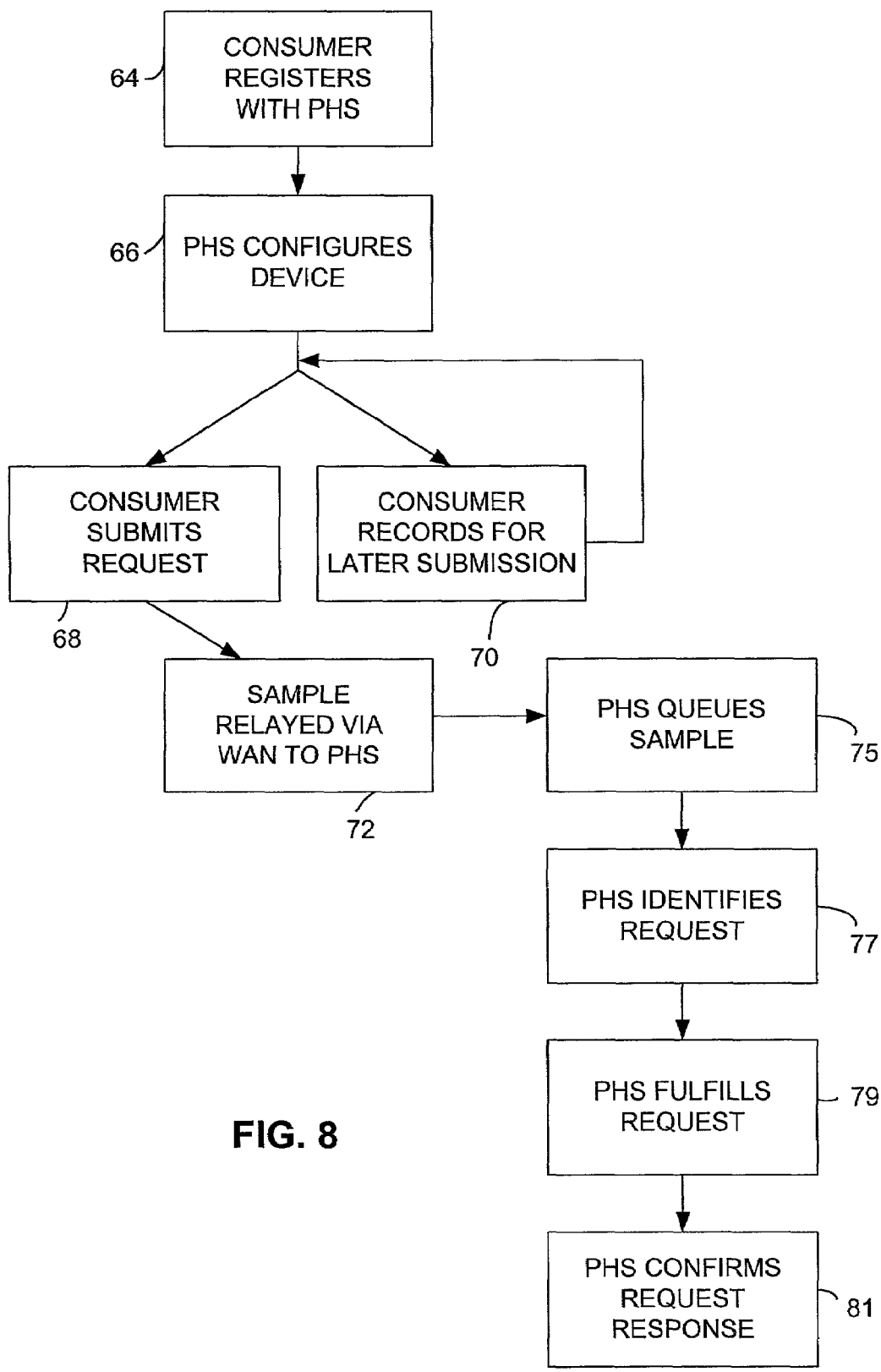
FIG. 8 is a flow diagram of a method for selling a consumer a product or service related to audio programming to which the consumer is listening at the time of purchase.

Depending upon the specific design of the device and the nature of the request transmission, the PHS may analyze and process the request differently. FIG. 7 illustrates the elements of a suitable PHS. FIG. 8 illustrates the method by which the PHS and device 18 operate.

As noted above, when purchasing or otherwise obtaining device 18 or at any other suitable time, consumer 10 registers with the PHS at step 64. At step 66 the PHS configures device 18. As part of the registration step, the PHS obtains from consumer 10 preferences about payment method, retailer, and delivery options. Consumer 10 can thereafter use the device as described above while listening to the radio or other source of audio content and initiate requests. As indicated by steps 68 and 70, respectively, consumer 10 has the option of initiating requests contemporaneously with the broadcast or in a time-delayed manner.

When a request is transmitted from device 18 at step 72, a WAN communication server 74 (FIG. 7) of the PHS that is coupled to the public switched telephone network (PSTN) accepts the transaction record and, at step 75, stores or queues it in a transaction database 76 for identification. When a request is received, a purchase identification module 78 first reads the serial number on the transaction and verifies that it is not a duplicate of the same serial number from the same device number. If so, the record is discarded. If not, purchase identification module 78 uses the purchase device serial number in transaction database 76 record to find a profile for consumer 10 in a consumer database 80 where it was stored when device 18 was initialized, i.e., during registration step 64. Using information from the profile, server 74 determines the location of the purchase and the relevant radio stations local to consumer 10 at the time of the request.

The PHS analyzes the broadcast frequency and the time of request found in the stored transaction record. If necessary, the PHS adjusts the time according to the relative time zone of consumer 10 found in the stored profile. Checking the information stored in a broadcast play schedule database 82 against the time and frequency data in the transaction record, at step 77 the PHS identifies the request based upon the broadcast content at that time. For example, a purchase request for music results in identification of the artist, song, and album. Database 82 can be maintained and updated by the broadcaster or other broadcast schedule maintenance organization 83. The identification data are placed in a purchase record stored in a purchase database 84. This record contains the following:

1. the consumer's profile,
2. the transaction time,
3. the recorded audio data from the transaction record,
4. the product identification information.

In alternative embodiments where the request is for something other than a purchase, this record contains identification information about the relevant service, event or other entity or activity that was broadcast at the time of request.

If the frequency or time is indeterminate or not contained in play schedule database 82, purchase identification module 78 creates a content matching record in a matching database 86. This matching database record contains the consumer's profile and the transaction record. A matching module 88 processes new records in matching database 86. Matching module 88 performs a comparison of the audio data in the transaction record with a database of digital music recordings. If a match is found, a record is created in purchase database 84. If no match is found, the matching record is flagged as requiring processing by a research organization 90, which is an organization of people or technology whereby the transaction request is identified. For example, in the case of a music purchase request that cannot be electronically identified without human intervention, research organization 90 would employ multimedia computer terminals with which one or more technicians listens to the recorded audio sample and attempts to identify it. Research organization 90 may be composed of experts from various music-related sectors. In embodiments of the invention in which the deliverables that can be requested are not related to music, the technicians or other personnel can be experts in whatever fields are relevant to the deliverables.

If the product, service or other deliverable can be identified, a record with the relevant data is created in purchase database 84. If not, a notification that the request cannot be processed is forwarded to a consumer notification module 92. Module 92 then generates an e-mail, voice mail, or other message form as indicated in the consumer's profile. Purchase database 84 is continuously monitored by an automated electronic commerce shopping module 94. Module 94 takes the completed purchase data and first performs a final validation-matching step that compares the desired purchase with the recorded audio sample. Through this comparison, shopping module 94 confirms the match between the identification data and the purchase request data.

At step 79 shopping module 94 then searches one or more e-commerce sites or portals 95, including the user's preferred sites as identified in user's profile, for the product, service or other requested deliverable. Based upon the costs for the product, taxes, and shipping as described on the sites, shopping module 94 identifies the best price and item source. Shopping module 94 checks purchase database 84 for other orders to be processed and can combine multiple orders for the same consumer if necessary. If the item cannot be found on the preferred sites or portals, shopping module 94 then searches for a site 95 offering the most favorable commission or other benefit to the PHS. Shopping module 94 then consummates a sale with the e-commerce merchant by interacting with the site on which the item is found.

If the consumer's profile specifies conventional mail or similar form of physical delivery (or if the deliverable is not of a nature that can be delivered by electronic means), the merchant mails, ships or otherwise delivers it to consumer 10. In the illustrated embodiment, in which the deliverable is a music recording, if the consumer's profile specifies digital media as the preferred form of delivery, the PHS composes an e-mail message with an attachment of the music recording in MP3 or other suitable digital format. In the case of new releases of popular albums, it is likely that large numbers of purchase requests will be received for the same product. In such cases, block purchases of media can be secured at a discount price, thus raising the PHS's ability to add commission fees for the service. Where applicable, the consumer's loyalty profile with the e-commerce provider is leveraged for a more optimal discount, point-based rewards to the consumer, etc. In any event, at step 81 the PHS informs consumer 10 via e-mail or other suitable means that it has completed a response to the request.

Fee structures may vary extensively, but will most likely primarily benefit the PHS. On the other hand, the broadcast stations, even if they pay a fee to the PHS for the service, will receive an increase in response rates both to advertising and to general content requests. In fact, these broadcast stations could negotiate a marginal profit with the PHS for any purchase made through interaction with their programming. Fees paid by the e-commerce retailer for an initial purchase by a new consumer might provide a significant benefit arising from the invention.

In the illustrated embodiment of a purchasing system, if the product is not found for sale on any e-commerce site, a manual process of shopping for and shipping the item to the consumer is initiated as a convenience to the consumer. Alternately, the consumer is sent an email or voice mail declaring that the sale could not take place.

When the order is placed successfully with an e-commerce provider, a confirmation e-mail or voice mail is provided to consumer 10 indicating the expected delivery date, the merchant used, a breakdown of the costs, and other relevant transaction data. To facilitate a quick response method for consumer 10 to void requests, in other embodiments of the invention a VOID button can be included in the consumer-operated device, to which the PHS responds by voiding or rolling back the transaction. Similarly, a CONFIRM button can be included and used to immediately respond to the PHS's communication that the request has been fulfilled and is ready for delivery.

The final steps of the interactive process will vary according to the nature of the interface on the particular consumer-operated device and the consequent range of prospective interactive requests. For example, if an INFO button is included, the user may wish to activate it to obtain samples or additional information prior to making a purchase. Further information could take the form of a sample, such as a clip from an audiotape or a sample issue or trial size of the advertised product. In scenarios in which the audio content that is broadcast relates to community events, services, or groups, the user can activate such an INFO button to obtain additional information about the content at the time. Delivery for the requested content will differ according to the nature of the content itself. For example, the deliverable relating to an event or service can take the form of an admission ticket or discount coupon.

As the system and method of interaction becomes more popular, programming could be adjusted to maximize the effectiveness of the invention for the broadcast station contributors. Broadcast companies, retailers, or advertisers may use inaudible "watermarks" known in the art to track consumer responses during particular segments. Depending upon the particular embodiment, the retailer or broadcast station may use the device in these and other ways to interact with the consumer. For example, via a WAN the retailer may access the consumer profile and, upon the activation of the device by the consumer, offer suggestions on related products or specific alternatives to the product to which the consumer responded. Consumer interactions could be sorted, compiled and sold or otherwise given to broadcasters and retailers for the purpose of ascertaining effectiveness of marketing, trends in consumer entertainment or purchase habits, or other meaningful sampling data. In addition to the increase in sales of goods and services, participating companies and other sales and marketing organizations 96 could receive valuable demographic and marketing information by analyzing consumer database 80.

The invention allows the consumer on-the-go a means to initiate requests without having to engage other devices. Prior art requires that the consumer interact with a computer, phone, or other device, thus inhibiting the desired spontaneity of the engagement.

The invention also simplifies the request process to a single step. To make a purchase or other request, the consumer merely has to click a button. Furthermore, the nature of the interaction goes beyond that of simply making a purchase. The invention allows consumers to initiate a range of requests, from soliciting information to signing up for activities.

In addition, the invention allows the consumer on the go to meet needs that are thought of spontaneously. Existing devices that enable spontaneous consumer engagements restrict the application to narrow markets, such as purchasing music on the radio. This system and method enables impulsive buying of any type of item in any context.

The invention also enables integration with other technology. This feature is intended for two purposes. First, the device can be physically combined with sources of broadcast media, such as a car radio or television. Both devices can share resources and features, making the request process more reliable and more efficient. Second, the invention may be combined with other technology to give the consumer even greater freedom and mobility. By incorporating the device in a cell phone, for example, the consumer need only carry one item to engage the service while retaining the functionality needed for typical phone applications.

A tremendous advantage of the disclosed PHS is that it provides an effective and immediate link between the consumer and a range of retailers, advertisers and other suppliers of broadcast content. Benefits for the broadcast stations are many, including a source of demographic information about listeners and response rates, increased advertising revenues from greater customer response, and an overall improvement in response rate to broadcasting. Broadcast stations have a new means of consumer interaction and can alter programming suitably to include prompts for consumer response. Advertisers, community services, and other users of broadcast media will benefit from the increase in consumer response to their content. As the PHS may charge broadcast stations for the service, in addition to or instead of the consumer, this business component of the disclosed method will find the invention to be a solid source of revenue.

Advantages to the consumer are numerous. The consumer not only has an immediate and effective means of request fulfillment, but also a way of immediately responding to broadcast media. For example, the consumer can order a product while listening to its description on the radio, without the need to write down the details and obtain the item later. Nor does the consumer have to engage a multi-step process of entering a PIN or other information, which can be distracting and potentially dangerous when driving a car. With this one device, the consumer may respond to a community announcement, register for a local event, request a sales call by an advertiser, or click in for a promotional item. No other device on the market meets so many needs of the common consumer, nor does any device that meets one of these needs perform the engagement in a single step.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein.

It is intended that the specification and examples be considered as exemplary only, with a true scope and spirit of the invention being indicated by the following claims.

What is claimed is:

1. A system for conducting a transaction between a person and a remote service, comprising:
an electronic device operable by said person, comprising:
a housing;
a microphone for recording audio;
a request input accessible to said person on said housing;
a wireless modem circuit integral to said housing for communicating with a network;
a processor programmed to include:
a sampling task continuously directing recording of the audio on a first-in-first-out (FIFO) basis, providing a continually updated fixed interval of audio recording;
a request handling task ascertaining a readiness state for a purchase request by interacting with said sampling task in response to activation of said request input, said request handling task moving sampling data into a transaction queue to transmit a consumer request; and
a buy task continuously awaiting creation of a transaction queue record and, finding said record, initiating a remote connection to said processor host service and creating a communication record including request data and said recorded signal sample; and
said remote service at a location remote from said person comprising:
a detector detecting said request;
a matcher matching said content to said deliverable to identify said deliverable in response to said request; and
a deliverable controller controlling delivery of said deliverable to said person.

2. The system of claim 1, wherein said service comprises:
a tracking module storing, searching and retrieving profile information about said person and said device, pending and completed request transactions and sources for said requests;
an identification module identifying said request;
a shopping module obtaining a deliverable fulfilling said request for said person; and
a delivery module controlling delivery of said deliverable to said person.

3. The system of claim 1 wherein said service maintains a database for storing, searching and retrieving profile information about said person and said device, broadcast station programming, pending and completed request transactions and sources for said requests.

4. The system of claim 1 wherein said service has a notification module that initiates transmission of an indication of a status of said request to said person.

5. A system for conducting a transaction between a person and a remote service, comprising:
an electronic device operable by said person, comprising:
a housing;
a microphone for recording audio;
a request input accessible to said person on said housing;
a wireless modem circuit integral to said housing for communicating with a network;
a clock circuit;
a radio receiver;
a processor programmed to include:
a sampling task continuously directing recording of the audio on a first-in-first-out (FIFO) basis, providing a continually updated fixed interval of audio recording;
a request handling task ascertaining a readiness state for a purchase request by interacting with said sampling task in response to activation of said request input, said request handling task moving sampling data into a transaction queue to transmit a consumer request; and
a buy task continuously awaiting creation of a transaction queue record and, finding said record, initiating a remote connection to said processor host service and creating a communication record including request data and said recorded signal sample; and wherein said processor scans a predetermined range of broadcast frequencies and compares said signals from sampling task to signals received by said radio receiver to determine and fix a match between them; and
said remote service at a location remote from said person comprising:
a detector detecting said request;
a matcher matching said content to said deliverable to identify said deliverable in response to said request; and
a deliverable controller controlling delivery of said deliverable to said person.

6. The system of claim 5 wherein said device further comprises:
a battery-operated power supply;
a visible indicator indicating a state of readiness of said device to accept said request;
a speaker integral to said housing for emitting tones indicating the status of said consumer's request; and
said tuning task adjusts said indicator to indicate a status of said match.

* * * * *